United States Patent [19]
Peterson et al.

[11] Patent Number: 6,119,608
[45] Date of Patent: Sep. 19, 2000

[54] SEED FURROW CLOSING AND COVERING DISK

[75] Inventors: Richard L. Peterson, LeSueur; Roger J. Scheurer, Kasota, both of Minn.

[73] Assignee: Hiniker Company, Mankato, Minn.

[21] Appl. No.: 09/115,467

[22] Filed: Jul. 14, 1998

[51] Int. Cl.$^7$ ........................................................ A01C 5/00
[52] U.S. Cl. ............................ 111/192; 111/189; 111/52; 172/604; 172/705; 172/551
[58] Field of Search .................... 111/191, 194, 111/192, 193, 195, 196, 189, 52; 172/701, 538, 705, 710, 540, 551, 604

[56] References Cited

U.S. PATENT DOCUMENTS

| | | | |
|---|---|---|---|
| 540,015 | 5/1895 | Boyd | 172/538 |
| 2,659,289 | 11/1953 | Holman . | |
| 2,755,751 | 7/1956 | Beilke . | |
| 3,752,237 | 8/1973 | Hornung | 172/538 X |
| 4,070,974 | 1/1978 | Stacy, Jr. | 111/194 X |
| 4,307,674 | 12/1981 | Jennings et al. . | |
| 4,619,331 | 10/1986 | Johnson, Sr. | 172/538 X |
| 4,714,033 | 12/1987 | Neumeyer | 111/194 |
| 5,375,542 | 12/1994 | Schaffert | 111/192 |
| 5,389,625 | 2/1995 | Muro et al. . | |
| 5,425,318 | 6/1995 | Keeton . | |
| 5,511,498 | 4/1996 | Lohrentz et al. | 111/191 |
| 5,595,130 | 1/1997 | Baugher et al. | 111/170 X |
| 5,802,995 | 9/1998 | Baugher et al. | 111/170 X |

Primary Examiner—Victor Batson
Attorney, Agent, or Firm—Reising, Ethington, Barnes, Kisselle, Learman & McCulloch, P.C.

[57] ABSTRACT

The planer row unit has a unit frame with a front member that is adapted to be secured to a tool bar. A sub frame is secured to the front member by parallel links. A furrow opener disk, a seed shoe and a gauge wheel are secured to the subframe.

A cam plate supported by a spring to the rear of the seed shoe presses seeds into moist soil in the bottom of a seed furrow. A seed covering disc is supported by a covering disc shank to the rear and to one side of the furrow opener. The covering disc has a circular plate portion that faces downwardly and forwardly, moves loose soil from the furrow opener into the seed furrow and rotates about a central axis that extends downwardly from a horizontal plane. A flange, with notches extends radially outward and rearwardly from the outer periphery of the circular plate portion, rolls and slides along the surface and limits soil penetration by the covering disk.

18 Claims, 3 Drawing Sheets

6,119,608

SEED FURROW CLOSING AND COVERING DISK

TECHNICAL FIELD

This invention relates to drills for planting crops and more particularly to a covering disc that covers seed that has been deposited in a slit or furrow in the ground.

BACKGROUND OF THE INVENTION

Grain drills and planters form a slit or furrow in the ground, deposit seed in the slit, and cover the seed with soil. The soil that covers the seed is often compacted by a press wheel. The seed covering portion of planting is relatively simple when the field has been cultivated and there is little or no residue from the previous crop. The seed covering portion of the planting process may be very difficult when the field has not been cultivated, and the surface is covered with a thick mat of crop residue from an earlier crop or crops that were grown in the field.

Planters and grain drills, that are planting crops in a cultivated field, form ridges of loose soil between the furrows that seed is deposited in. A press wheel that rolls down the furrow after seed is deposited in the furrow, tends to force soil from the sides of the ridges down on top of the seed dispensed in the furrow. At the same time, soil is moved over the seed, the soil above the seeds is compacted. In some cases, too much soil is deposited on top of the seeds, and plants are not able to grow up through the soil that covers them. Compacted soil above seeds tends to form a hard crust as it dries following a rain. Seed that has germinated is frequently unable to emerge through such a crust and dies, even if the crust is relatively thin. Implements such as rotary hoes have been developed to break up crusted soil so that plants can emerge. Unfortunately, rotary hoes cannot always break up crusted soil. In many cases, a hard crust that forms above seeds after a rain will kill the seeds and make it necessary to replant the field.

Planters and grain drills that plant crops in fields subjected to no till or minimum tillage farming practices also have problems covering the seed with soil. Seed which is not covered with soil and is exposed to the sun and air will generally not germinate. Press wheels merely roll on the surface of the soil and cannot move compacted soil, at the sides of the slit that receives the seed, down into the slits to cover the seed.

Discs have been employed at either one or both sides of a furrow to form a new furrow and to cover the seeds with a ridge of soil. Such discs can place too much soil on top of seed. When such discs are employed in fields with some surface residue, they tend to ride up over some residue and not cover seeds at times. At other times, they tend to cover seeds with too much soil.

Coulters with fluted blades are frequently employed on drills and planters in, front of the assembly that forms a slit or furrow and deposits seed in the furrow, to cut old crop residue. By cutting through the residue in front of a furrow forming and seed placement assembly, the furrow forming assembly is able to penetrate the soil and place seed at the desired depth. To cover the seed and fill the seed furrow with a closing disk, the disc has to be positioned to one side of the seed furrow. This places the closing disc to the side of the fluted blade coulter where there is old crop residue. The old crop residue forces the closing disc up out of the soil at times, and lets the covering disc penetrate too deeply into the soil at other times. The operation of covering discs in these conditions result in some seed not being covered with soil and other seed being covered with excess soil, as explained above.

SUMMARY OF THE INVENTION

An object of the invention is to provide a seed covering disc which covers seed with loose soil. Another object of the invention is to provide a seed covering disc that does not form a furrow in the ground. A further object of the invention is to provide a seed covering disk that eliminates residue bunching and plugging in heavy, old crop residue conditions. A still further object of the invention is to provide a seed covering disc with adjustments for changing the position where soil discharged by the disc is deposited.

The closing and covering disk for grain drills and planters includes a generally flat round plate portion with a central mounting bore. A flange on the radially outer periphery of the round plate portion is bent to one side of the round plate portion. A plurality of notches are cut from the periphery of the flange to divide the flange into a plurality of flange sections. A bearing hub is secured in the central mounting bore in the covering disk. A spindle is mounted in the bearing that is held in the bearing hub.

The spindle is secured to a mounting plate and held in a position in which the axis of the spindle extends downward and outward from the mounting plate at an angle of about 38° from a horizontal plane. The mounting plate is attached to a plate on the free end of a shank by fasteners. These fasteners permit the position of the mounting plate to be adjusted relative to the plate on the shank. A forward end of the shank is pivotally attached to a planter or grain drill frame. A spring biases the shank in a direction that forces the closing and covering disc toward the ground.

A seed furrow opener disk is rotatably journaled on the frame in a position to form a seed furrow and to throw soil removed from the furrow to a first side of the opener disk and to the rear. Seeds are deposited in the seed furrow on a second side of the opener disk.

The closing and covering disc engages the soil that is thrown to a first side of the seed furrow opener and to the rear and throws the soil that is engaged toward the seed furrow and to the rear. The soil thrown by the closing and covering disk covers seed in the seed furrow with loose soil and at least partially fills the seed furrow.

The axis of the spindle is in a vertical plane that is at an angle of between 38° and 66° to the direction of travel. The position of the spindle relative to the shank is adjustable to change the position of the closing and covering disk relative to the direction of travel. By adjusting the position of the closing and covering disk relative to the direction of travel, a quantity of new soil covering seeds in the seed furrow can be adjusted.

BRIEF DESCRIPTION OF THE DRAWING

The presently preferred embodiment of the invention is disclosed in the following description, and in the accompanying drawings, wherein.

DESCRIPTION OF THE PREFERRED EMBODIMENT

Figure 1:
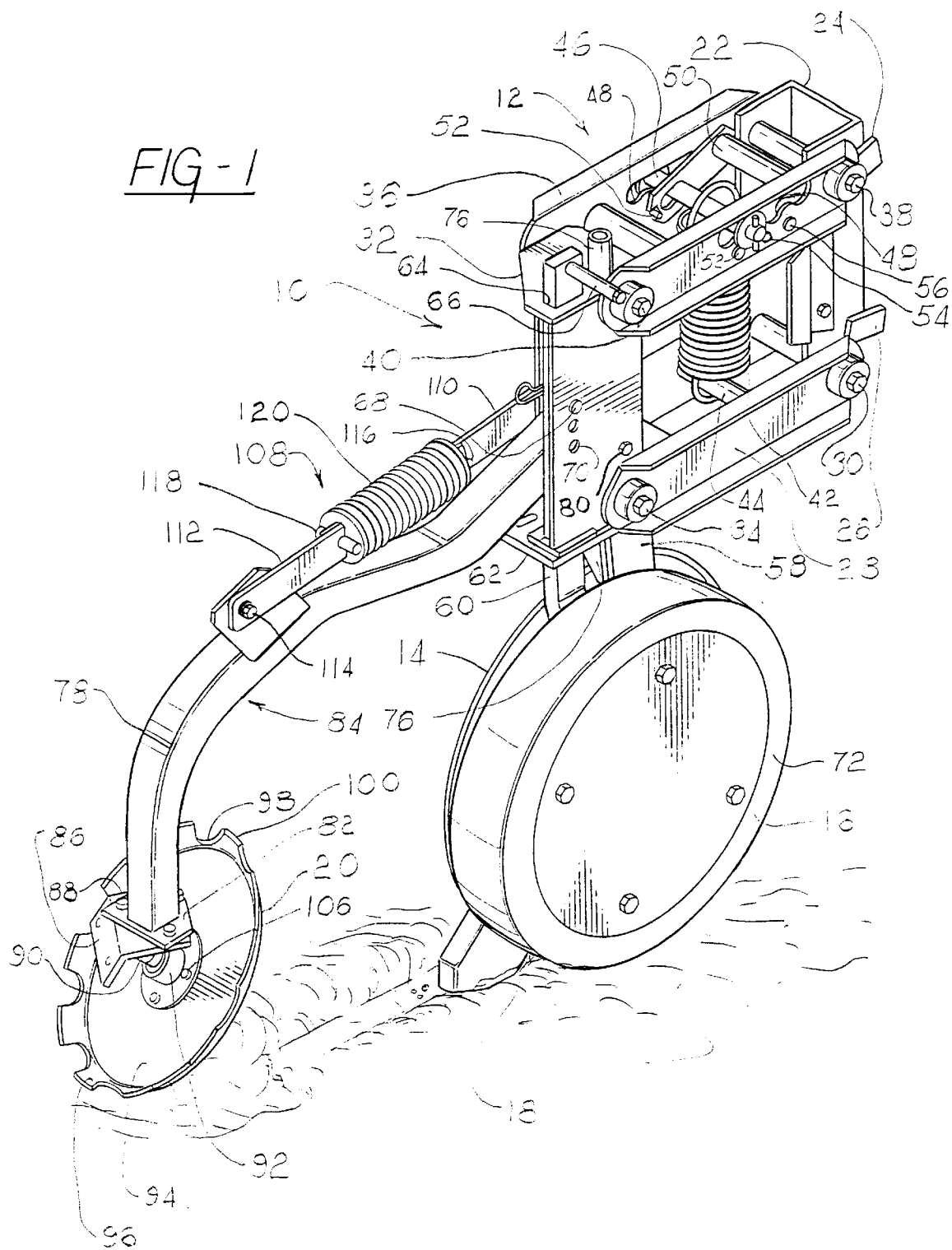
FIG. 1 is a perspective view of a tool bar mounted planter row unit with a furrow closing and seed covering disk.
Figure 3:
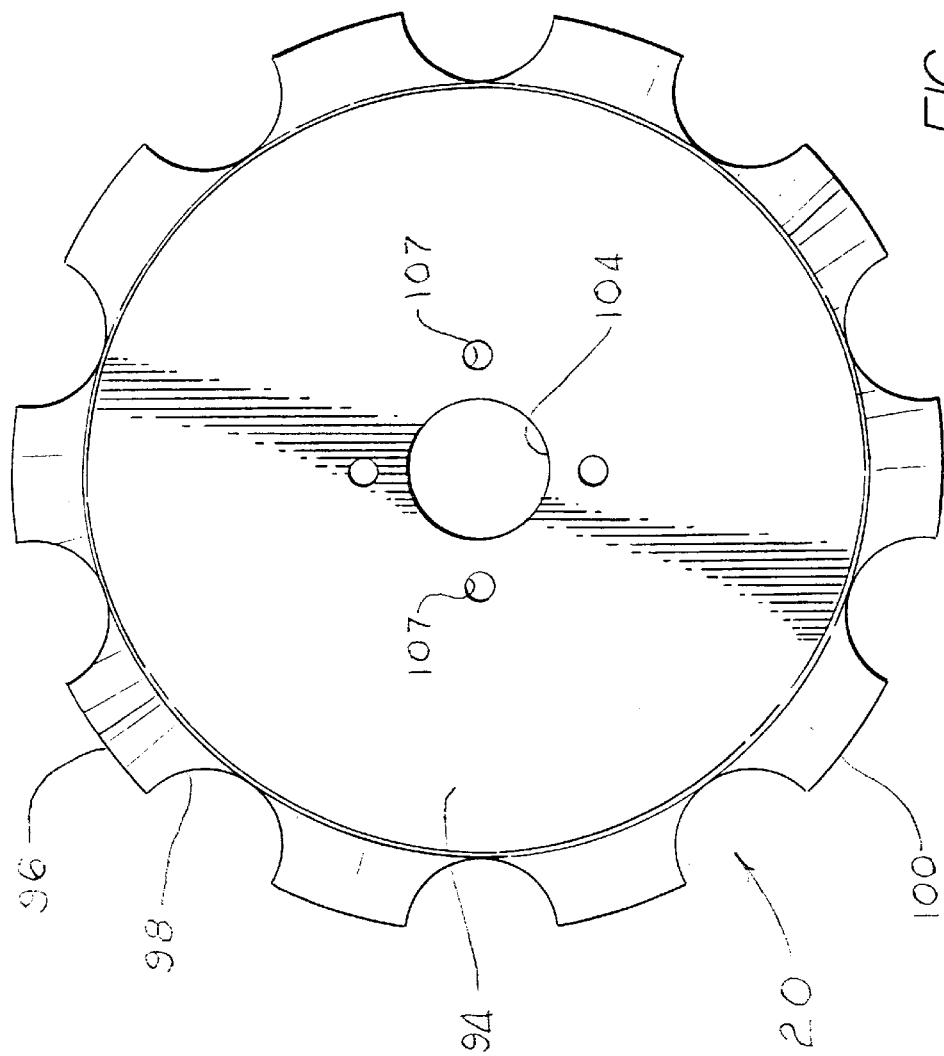
FIG. 3 is a front elevational view of the furrow closing and seed covering disk.
Figure 2:
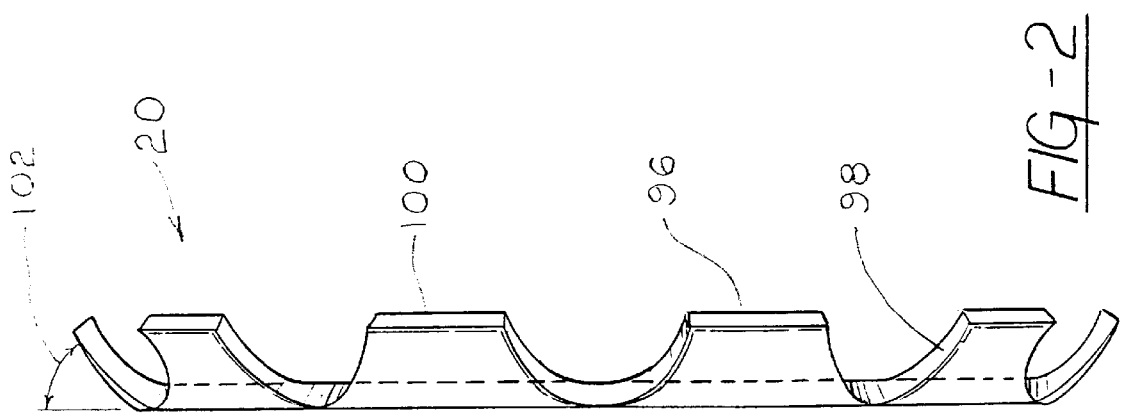
FIG. 2 is a side elevational view of the furrow closing and seed covering disk.

The planter row unit 10, as shown in FIG. 1, has a unit frame 12, a seed furrow opener disk 14, a gauge wheel 16, a seed shoe 18, and a furrow closing and seed covering disk 20. The planner row unit 10, as shown, is for an air seeder with a central seed dispense and a blower that provides air to convey seed to the seed shoe 18. The planter row unit 10 could be equipped with a seed box and a seed dispenser to form a unit planter if desired. Unit planters generally rely upon gravity to carry seed to the seed shoe 18.

The unit frame 12 includes a front channel 22 that clamps to a tool bar. Guide bars 24 and 26 position the channel 22 vertically on the tool bar. A lower link assembly 28 is pivotally attached to the first channel 22 by a bolt 30 and to a rear subframe 32 by a bolt 34. An upper link assembly 36 is pivotally attached to the front channel 22 by a bolt 38 and to the rear subframe 32 by a bolt 40. The parallel lower link 28 and upper link 36 form a pantographic linkage which holds the subframe 32 in a generally vertical position and parallel to the front channel 22.

A tension spring 42 is connected to a pin 44 rigidly secured to the lower link 28 and to a pin 46 that sits in notches 48 in the upper link 36. Moving the pin 46 to a pair of notches 48 that is further from the pivot bolt 38 increases the downward force on the gauge wheel 16. Moving the pin 46 to a pair of notches 48 that are closer to the pivot bolt 38 decreases the downward force on the gauge wheel 16. A lever 50 is pivoted about pivot pins 52, 54, or 56 to move the pin 46 between notches 48.

The seed furrow opener disk 14 is rotatably journaled on an opener disk shank 58. As shown in FIG. 1, the opener disk 14 throws soil to the left when it is moved forward by a tractor. Planter row units 10 are also constructed with seed furrow opener disks arranged to throw soil to the right.

The gauge wheel 16 is journaled on a gauge wheel shank 60. The upper end of the shank 60 passes through slots 62 and 64 in the rear subframe 32. A handle 66 is provided on the upper end of the shank 60 for manually moving the shank in the slots 62 and 64 to the desired depth setting. A pin 68 is inserted through one of a series of apertures 70 and bores through the shank 60 to hold the gauge wheel 16 at the chosen depth setting. The gauge wheel 16 includes a rubber tire 72 mounted on a metal rim assembly 74. The forward edge of the rubber tire 72 runs close to the seed furrow opening disk 14 and is spaced from the disk at the rear to make room for the shanks 58 and 60, the seed tube 76 and the seed shoe 18. The upper end of the seed tube 76 is connected to a seed distributor tube (not shown) that carries seed in a stream of air from a seed dispenser. Seed shoe 18 receives seed from the seed tube 76, deposits the seed in the bottom of a furrow formed by the disk 14 and a plastic cam plate 124 presses the seed into moist soil in the bottom of the furrow.

The furrow closing and seed covering disk 20 is part of a disk assembly 84 that includes a covering disk tubular shank 78. The covering disk shank 78 is pivotally attached to the rear subframe 32 by a pin 80. A generally horizontal plate 82 is welded to the free end of the covering disk shank 78. A mounting plate 86 is connected to the horizontal plate 82 by bolts 88. A series of bolt holes (not shown) permit the mounting plate 86 to be rotated about a vertical axis to a chosen position and then clamped in the chosen position by the bolts 88. Arcuate slots can be provided in the mounting plate 88 rather than bolt holes for the passage of the bolts 88. With slots in the mounting plate 86 or the horizontal plate 82, the bolts 88 can be merely loosened and then retightened after the mounting plate has been rotated to a new position.

A spindle 90 is secured to the mounting plate 86 with its axis extending downwardly from a horizontal plane at an angle of about 38°. A bearing and bearing hub 92 are mounted on the free end of the spindle 90.

The furrow closing and seed covering disk 20 has a flat circular plate portion 94 with a flange 96 on its outer periphery. A series of notches 98 are cut in the flange 96 to form a plurality of teeth 100 which are bent from the plane of the plate portion 94 by an angle 102 of a about 52°. A central bore 104 in the center of the plate portion 94 of the disk 20 receives the bearing hub 92. Bolts 106 pass through apertures 107 and clamp the disk 20 to the bearing hub 92. The teeth 100 extend to the side of the plate portion 94 which faces the mounting plate 86.

A bar assembly 108 includes a front bar 110 that is pivotally attached to the rear subframe 32 by a pin and a rear bar 112 that is pivotally attached to the covering disk shank 78 by a bolt 114. Two pins 116 and 118 connect the bars 110 and 112 to each other and form a lost motion connection. A coiled compression spring 120 tends to force the pins 116 and 118 apart and bias the seed covering the disk 20 downward.

Figure 4:
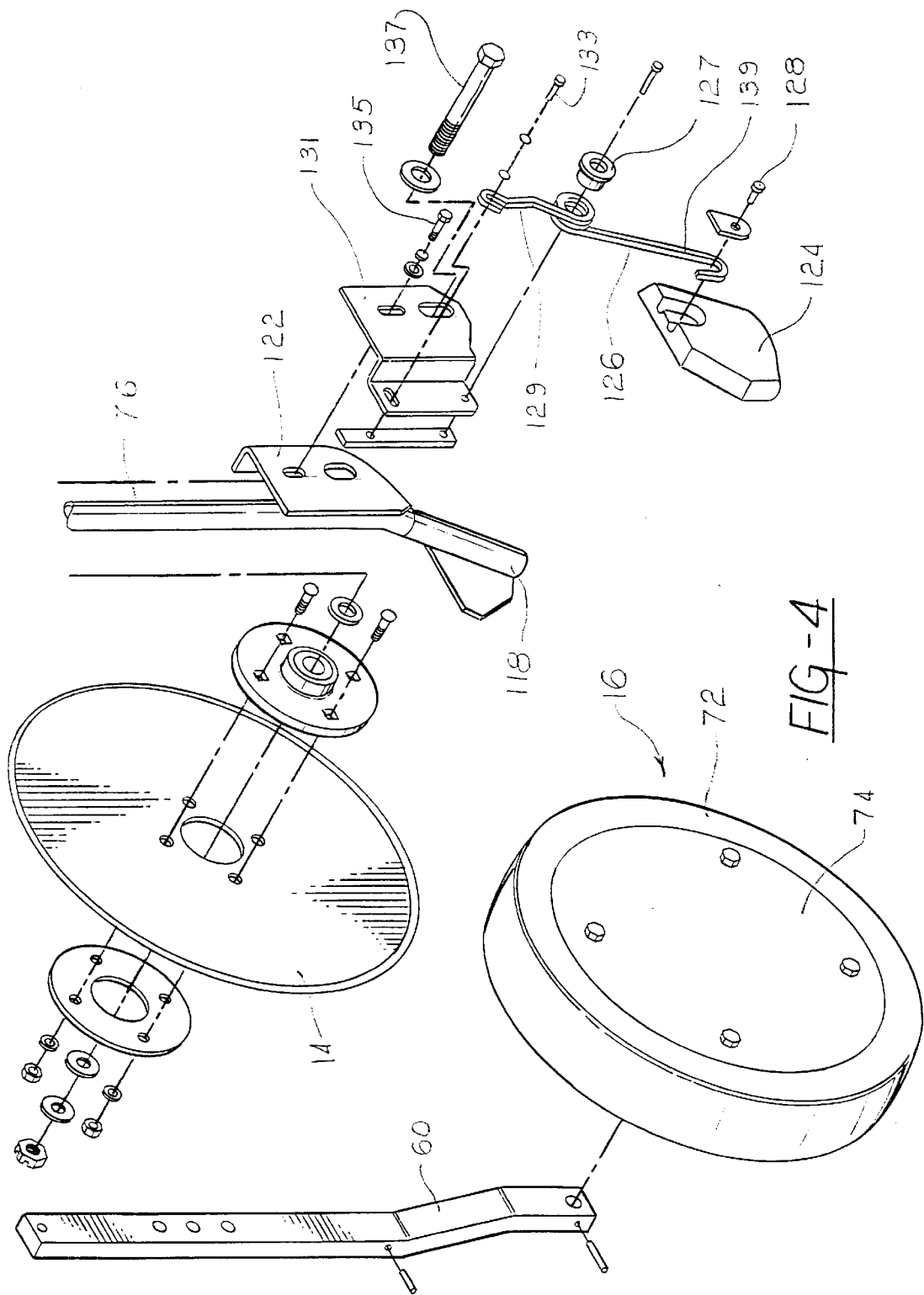
FIG. 4 is a expanded view of the seed shoe, furrow opener disk and the gauge wheel.

During planting operations, the planter row unit 10 is pulled forward by a tool bar and a tractor the tool bar is attached too. A seed furrow opener disk 14, as shown in FIG. 1, opens a furrow and displaces soil, removed from the seed furrow, upwardly, rearwardly, and to left. Seed passes down through the seed tube 76 to the seed shoe 18 that directs seed to the bottom of the seed furrow. The seed tube 76 and the seed shoe 18 are attached to the opener disk shank 58 by a bracket 122 shown in FIG. 4. The spring 126 is pivotally mounted on a bushing 127. An upper arm 129 of the spring 126 is anchored to the bracket 122 and a bracket 131 by bolt 133. Bolts 135 and 137 secure the bracket 131 to the bracket 122 and provide vertical adjustment of the bracket 131. A plastic cam plate 124 is attached to a lower arm 139 of the spring 126 by a bolt 128. The plastic cam plate 124 is directly to the rear of the seed shoe 18 presses seed in the bottom of the furrow into the moist soil.

The furrow closing and seed covering disk 20, which is moving forward along a path to the left of the furrow opener disk 14 and in line with the strip in which most of the soil thrown laterally by the opener disk 14 lands, throws loose soil from the seed furrow to the right and into the seed furrow where it covers the seed. The axis of rotation of the seed covering disk 20 is in a vertical plane that is positioned at about a 45° angle from the direction of travel. The flat, circular plate portion 94 of the disk 20 faces toward the furrow opener. The teeth 100 extend rearwardly from the plate portion 94 and insure rotation of the seed covering disk 20. The bottom tooth 100, which is in contact with the ground, is substantially horizontal and prevents the disk from penetrating into the surface of the ground and forming a furrow. Loose soil from the seed furrow contacts the flat circular plate portion of the rotating disk 20 and is thrown to the right, where it covers seed in the seed furrow with soft, loose soil that is not compacted. Soft, loose soil is less prone to form a crust as it dries after a rain than soil that has been compacted by a press wheel. The position of the seed furrow closing and seed covering disk 20, relative to the direction of travel, can be adjusted to control the quantity of soil deposited above seed in the seed furrow. Adjustment of the position of a vertical plane through the axis of rotation of the disk 20 relative to the direction of forward travel, made by changing the position of the mounting plate 86 relative to the covering disk shank 78, can result in the disk placing a substantial quantity of loose soil to the right of the seed furrow, to the left of the seed furrow, or on top of the seed furrow.

The furrow closing and seed covering disk 20 tends to slide up over old crop residue on the ground. Because the disk 20 rotates, it generally does not bunch crop residue or plug. The force exerted by compression spring 120 can be increased to move more loose soil toward the seed furrow and decreased to reduce displacement of soil toward the seed furrow.

Planter row units 10 as described above have a seed furrow opener disk 14 that throws loose soil to the left. Row units 10 are also constructed with seed furrow opener disks 14 which throw loose soil to the right. With units that throw soil to the right, the position of the gauge wheel 16 and the seed covering disk 20 must be changed too.

The furrow closing and seed covering disk 20 does not create a new furrow in a field that could channel water and lead to erosion. The seed covering disk 20 is therefore useful on drills and planters that do not have individual row units 10 and row unit frames 12.

It is to be understood that other embodiments of the invention which accomplish the same function are incorporated herein within the scope of any ultimately allowed patent claims.

What is claimed is:

1. A seed covering disk comprising a circular plate portion, a flange on an outer peripheral portion of the circular plate portion that is integral with the plate portion and extends to one side of the plate portion at an angle that is between 32° and 72° from a plane including a large circular surface of the circular plate portion, and an axis of rotation that is perpendicular to said plane and passes through a center portion of the circular plate portion, a spindle is secured to a covering disc shank and holds the portion of the flange, that is in a vertical plane through the axis of the spindle and below the spindle, substantially horizontal, and wherein the spindle is adjustably secured to the covering disk shank for adjustment about a generally vertical axis relative to the covering disk shank.

2. The seed covering disk of claim 1 wherein the flange on the outer peripheral portion includes a plurality of notches.

3. The seed covering disk of claim 1 wherein the circular plate portion has a central aperture and a hub passes through the central aperture and is secured to the circular plate portion.

4. The seed covering disk of claim 1 wherein the flange on the outer peripheral portion of the circular plate portion extends to one side of the plate portion at an angle of about 52° from the plane including the large circular surface of the circular plate portion.

5. A seed planter row unit comprising:
   a row unit frame including a front member adapted to be connected to a tool bar,
   a rear subframe, and at least two parallel links pivotally attached to the front member and the rear subframe;
   a furrow opener connected to the rear subframe;
   a covering disk shank secured to the subframe;
   a spindle secured to the covering disc shank; a seed covering disc journaled on the spindle for rotation about a covering disc axis that extends downwardly at an angle from a horizontal plane, and having a circular plate portion with an earth moving surface that is perpendicular to the covering disk axis, faces downwardly, forwardly, and to one side toward a furrow formed by the furrow opener and a flange on an outer peripheral portion of the circular plate portion that extends to a side of the circular plate portion opposite the earth moving surface and contacts a surface of a field.

6. A seed planter row unit as set forth in claim 5 wherein the furrow opener includes a furrow opening disc that is rotatably journaled on the unit frame.

7. A seed planter row unit as set forth in claim 5 wherein the covering disk shank is pivotally secured to the rear subframe and a spring biases the covering disk shank in a direction that urges the seed covering disk downward.

8. A seed planter row unit as set forth in claim 5 wherein the spindle is adjustably secured to the covering disk shank and is movable to a plurality of positions about a generally vertical axis relative to the covering disk shank.

9. A seed planter row unit as set forth in claim 5 wherein the covering disk axis extends downwardly from a horizontal plane at an angle of about 38°.

10. A seed planter row unit as set forth in claim 5 wherein the flange on the outer peripheral portion of the circular plate portion has a plurality of notches.

11. A seed planter row unit as set forth in claim 5 wherein the flange on the outer peripheral portion of the circular plate portion extends to one side of the circular plate portion at an angle of about 52° from a plane including a large circular surface of the circular plate portion.

12. A seed planter row unit as set forth in claim 5 including a gauge wheel journaled on the unit frame.

13. A seed planter row unit as set forth in claim 5 including a spring secured to the unit frame and a cam plate attached to the spring and positioned in a furrow formed by the furrow opener, and wherein the cam plate presses seeds into moist soil in the furrow before loose soil is deposited in the furrow by the seed covering disk.

14. A seed planter row unit comprising: a unit frame; a furrow opener secured to the unit frame; a seed shoe attached to the unit frame and extending into a furrow formed by the furrow opener; a cam plate spring attached to the unit frame; and a cam plate non-rotatably fixed to and supported by the cam plate spring behind the seed shoe, and wherein the cam plate is operable to press seeds into moist soil in the furrow.

15. A method of covering seed in a seed furrow with soil using a seed covering disk with a circular plate portion having a central transverse axis, a flange integral with an outer periphery of the circular plate portion and extending radially outward from the circular plate portion and axially from one side of the circular plate portion, a plurality of notches in the integral flange and a spindle rotatably supporting the seed covering disc comprising:
   supporting the spindle with the integral flange in contact with a surface of the soil and generally horizontal along a line of contact between the integral flange and the surface of the soil;
   orienting the spindle so that the circular plate portion has a surface that faces generally downward and toward the seed furrow and the integral flange extends away from the surface of the circular plate portion that faces toward the seed furrow;
   rotating the seed covering disk as the seed covering disk moves along a path parallel to the seed furrow and to one side of the seed furrow;
   engaging loose soil from the seed furrow with the surface of the circular plate portion of the seed coving disk that faces toward the seed furrow to deflect the loose soil into the seed furrow; and
   adjusting the position of the spindle about a vertical axis to control the depth of the loose soil above seeds in the seed furrow.

16. A method of covering the seed in a seed furrow as set forth in claim 15 including:

pressing the seeds into a bottom of the seed furrow before the seed furrow receives the loose soil from the seed covering disc.

17. A method of covering seed in a seed furrow as set forth in claim 15 including:

adjusting a vertical force on the seed covering disc to further control the depth of the loose soil above the seeds in the seed furrow.

18. A seed planter row unit comprising:

a row unit frame including a front member adapted to be connected to a tool bar, a rear subframe, and parallel links pivotally attached to the front member and the rear subframe;

a furrow opener connected to the rear subframe;

a covering disk shank secured to the subframe;

a seed covering disc journaled on the spindle for rotation about a covering disc axis that extends downwardly at an angle from a horizontal plane, and having a circular plate portion and a flange on an outer peripheral portion of the circular plate portion that extends to one side of the circular plate portion and contacts a surface of a field;

wherein the spindle is adjustably secured to the covering disk shank and is movable to a plurality of positions about a generally vertical axis relative to the covering disk shank.

* * * * *